United States Patent [19]

Yoshimoto et al.

[11] Patent Number: 5,066,105

[45] Date of Patent: Nov. 19, 1991

[54] LIQUID CRYSTAL DISPLAY DEVICE HAVING VARISTOR LAYERS SUBSTANTIALLY FREE FROM CROSS-TALK

[75] Inventors: Hataaki Yoshimoto, Chiba; Katsuhiro Ito, Ichihara, both of Japan

[73] Assignee: UBE Industries, Ltd., Ube, Japan

[21] Appl. No.: 599,114

[22] Filed: Oct. 17, 1990

[30] Foreign Application Priority Data

Oct. 18, 1989 [JP] Japan .................................. 1-268999

[51] Int. Cl.$^5$ .............................................. G02F 1/13
[52] U.S. Cl. .................................... 359/58; 340/784; 359/55
[58] Field of Search ................... 350/333, 334, 336; 340/784, 719

[56] References Cited

U.S. PATENT DOCUMENTS

| | | | |
|---|---|---|---|
| 4,427,266 | 1/1984 | Hosokawa | 350/333 |
| 4,642,620 | 2/1987 | Togashi et al. | 340/719 X |
| 4,660,030 | 4/1987 | Maszawa | 340/784 |
| 4,842,372 | 6/1989 | Toyama | 350/334 |
| 4,871,234 | 10/1989 | Suzuki | 350/333 |
| 4,990,905 | 2/1991 | Kuijk | 340/784 X |

FOREIGN PATENT DOCUMENTS 2050031 12/1980 United Kingdom ............... 350/333

OTHER PUBLICATIONS

Castleberry, "Varistor Controlled Multiplexed Liquid Crystal Display", Conference Record of the 1978 Biennial Display, Research Conference Cherry Hill, N.Y., Oct. 1978.

"Two-Terminal Active Matrix LCD Using Al$_2$O$_3$", IBM Technical Disclosure Bulletin, vol. 28, No. 12, May 1986.

Baraff et al., "A 68 Line Multiplexed Liquid Crystal Display Using MIM Devices", Conference: International Electron Devices Meeting, Washington, D.C., Dec. 1980.

Primary Examiner—Stanley D. Miller
Assistant Examiner—Huy K. Mai
Attorney, Agent, or Firm—Finnegan, Henderson, Farabow, Garrett & Dunner

[57] ABSTRACT

A liquid crystal display device, capable of displaying clear images without cross-talk, comprises (a) a first transparent base, (b) a plurality of picture element electrodes on the first base, (c) a plurality of signal lines on the first base, (d) a second transparent base in parallel to the first base, (e) a plurality of scanning electrodes on the second base, (f) a plurality of transit electrodes on the second base and (g) a liquid crystal material layer arranged between the picture element electrodes and the scanning electrodes. The transit electrode is connected to the corresponding picture element electrode and signal lines through two separate connecting layers, at least one of which layers comprises fine varistor particles, or through a single connecting layer comprising fine varistor particles.

8 Claims, 5 Drawing Sheets

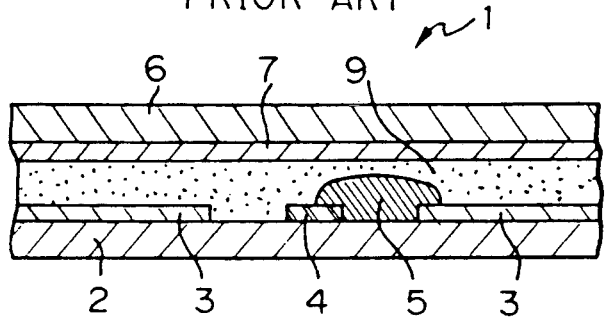
Fig. 1A PRIOR ART
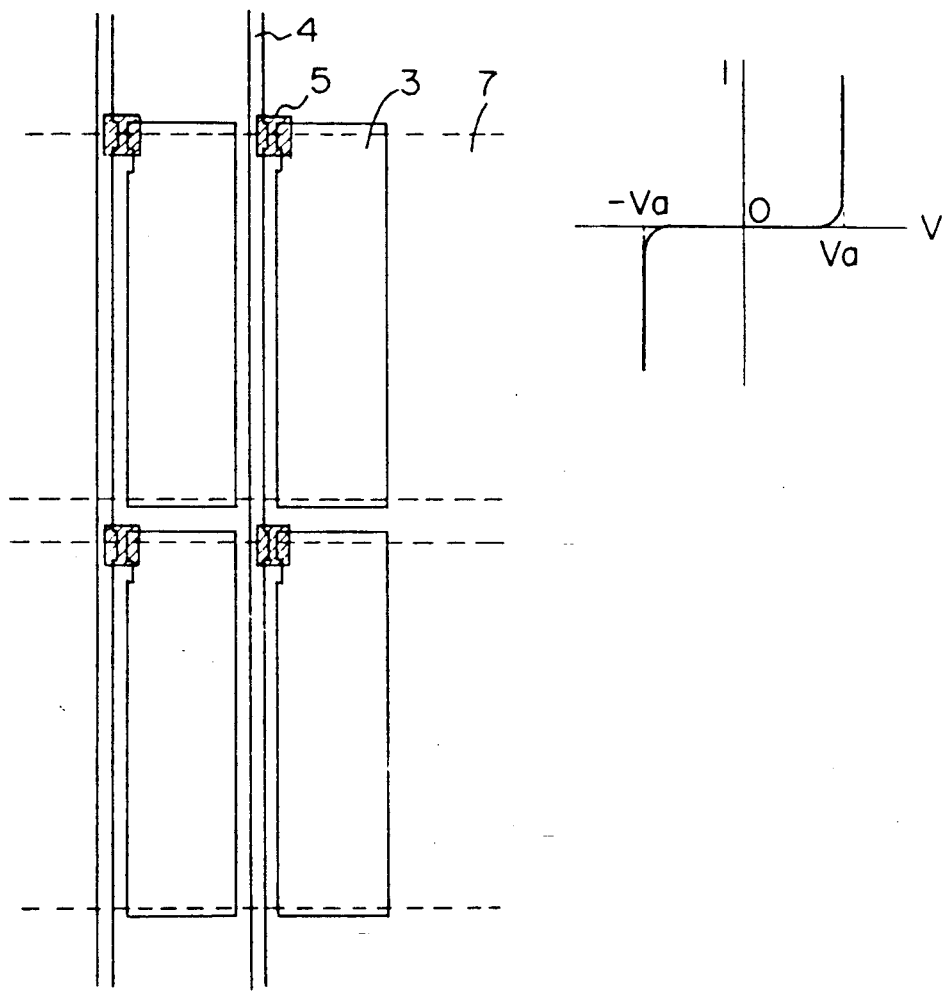
Fig. 1B PRIOR ART
Fig. 2

LIQUID CRYSTAL DISPLAY DEVICE HAVING VARISTOR LAYERS SUBSTANTIALLY FREE FROM CROSS-TALK

BACKGROUND OF THE INVENTION

1. Field of the Invention

The present invention relates to a liquid crystal display device substantially free from "cross-talk" and exhibiting a high brightness.

2. Description of the Related Arts

It is known that liquid crystal display (LCD) devices can be directly operated by using an IC device under a low drive voltage at a low power consumption, and can be easily constructed as a compact and thin device. In particular, TN type LCD devices are advantageous in that they can be operated under a low voltage at a low power consumption, and thus are widely utilized in various fields; for example, watches and desk-type electronic calculators.

The recent growing popularity of word processors, personal computers and other data processing devices has led to a demand for portable, small and thin devices of this kind, and to this end, LCD devices are replacing the cathode ray tube (CRT) devices as the display element in those machines. With the LCD device, it is necessary to reproduce the images of Chinese characters on the screens of those information-processing machines, since a great number of picture elements must be used in the LCD device in comparison with the number of the picture elements in the display devices for watches and desk calculators. Also, the LCD device can be operated by a simple matrix drive circuit in which a number of picture element electrodes are connected to signal lines in an X-Y matrix form. In this type of simple matrix drive system, the electrodes corresponding to the picture elements are not independent from each other, and thus when a predetermined voltage is applied to one picture element electrode, the voltage is also applied to the adjacent picture element electrodes, whereby the adjacent picture element electrodes are partly operated, i.e., an undesirable "cross-talk" occurs between the adjacent picture element electrodes.

To eliminate this cross-talk, it is known to utilize a non-linear element consisting of a diode, for example, a metal-insulator-metal diode (MIM), thin film transistor (TFT), or varistor for each picture element electrode, but it is very difficult to provide and arrange a large number, for example, several thousands to several hundreds of thousands, of diodes or thin film transistors corresponding to a large number of picture elements, all of which must have uniform properties and be free from defects, and thus there is an urgent need for the development of non-linear elements which can be easily provided with a uniform quality and will allow the use of an LCD device with a large display area.

In connection with the above, a new type of liquid crystal material usable for a display in a large area has been developed, through a new technology involving a polymer dispersed liquid crystal material, for example, an NCAP (nematic curvilinear aligned phase) type liquid crystal material containing a number of small liquid crystal particles dispersed in a polymeric matrix, or a liquid crystal composite membrane having a continuous phase liquid crystal contained in a polymeric matrix in the network form.

With this technology, it is now possible to easily control the thickness of the liquid crystal material layer in the display device, and therefore, the polymer-dispersed liquid crystal material can be formed as a layer having a large surface area, exhibits a very quick response, and allows the resultant display device to be given a wide angle of view without the use of a polarizer plate, and thus can be advantageously utilized to provide an LCD device having a large display surface area.

Nevertheless, the polymer-dispersed liquid crystal material is disadvantageous in that this liquid crystal material requires a drive voltage of from several tens to several hundreds of volts, which is remarkably higher than that of the TN type liquid crystal material, e.g., 5 volts or less. Therefore, a new-type of non-linear element which has a higher voltage resistance than that of conventional non-linear elements, for example, thin film elements, and can be driven at a low drive voltage, must be used for the polymer dispersed LCD device.

The inventors of the present invention attempted to provide a new-type of liquid crystal display device which has the polymer-dispersed liquid crystal material layer and in which a membrane consisting essentially of varistor particles is utilized as a non-linear element. This type of LCD device can display clear images or pictures without the occurrence of cross-talk, even where the device is operated at a high drive voltage.

Nevertheless, this type of display device is disadvantageous in that, when the picture element electrodes are very small, the proportion of the areas of the varistor layers through which the picture element electrodes are connected to the corresponding signal lines with respect to the total area of the display device becomes large, and therefore, the total display area in which the visible images are generated becomes small. If the areas of the varistor layers are reduced to avoid the reduction of the display area, the varistor voltages of the resultant varistor layers become variable (not constant), and thus it becomes difficult to obtain an even display of images. Also, due to the reduction in the areas of the varistor layers, it becomes impossible to flow a sufficient amount of electric current through the varistor layers, and thus the brightness (luminance) of the display face of the device is reduced. Namely, the brightness (luminance) is reduced by an increase in the duty ratio of the display device.

SUMMARY OF THE INVENTION

An object of the present invention is to provide a liquid crystal display device substantially free from cross-talk and capable of displaying visible images with a high brightness.

Another object of the present invention is to provide a liquid crystal display device in which a plurality of varistor layers, through which a plurality of picture element electrodes are connected to the corresponding signal lines, exhibit a constant and stable varistor voltage.

The above-mentioned objects can be attained by the liquid crystal display device of the present invention which comprises:

a first transparent base;

a plurality of picture element electrodes arranged on the first base;

a plurality of signal lines for supplying electric signals to the picture element electrodes and arranged adjacent to and spaced from the picture element electrodes on the first base;

a second transparent base arranged in parallel to and spaced from the first base;

a plurality of scanning electrodes arranged on the second base and facing and spaced from the picture element electrodes;

a plurality of transit electrodes arranged on the second base, facing and spaced from the corresponding signal lines and the picture element electrodes on the first base and spaced from the scanning electrodes on the second base;

a liquid crystal material layer arranged between the picture element electrodes and the scanning electrodes; and a plurality of varistor layers comprising fine varistor particles and each extending from at least one of the corresponding picture element electrode and signal line to the corresponding transit electrode, to electrically connect the picture element electrodes to the signal lines through the varistor layers and the transit electrodes.

BRIEF DESCRIPTION OF THE DRAWINGS

FIG. 1A is an explanatory cross-sectional view of a conventional liquid crystal display (LCD) device;

FIG. 1B shows an arrangement of picture element electrodes, signal lines, and non-linear elements in a conventional LCD device as shown in FIG. 1A;

FIG. 2 shows a voltage-current curve of a varistor;

DESCRIPTION OF THE PREFERRED EMBODIMENTS

Figure 3:
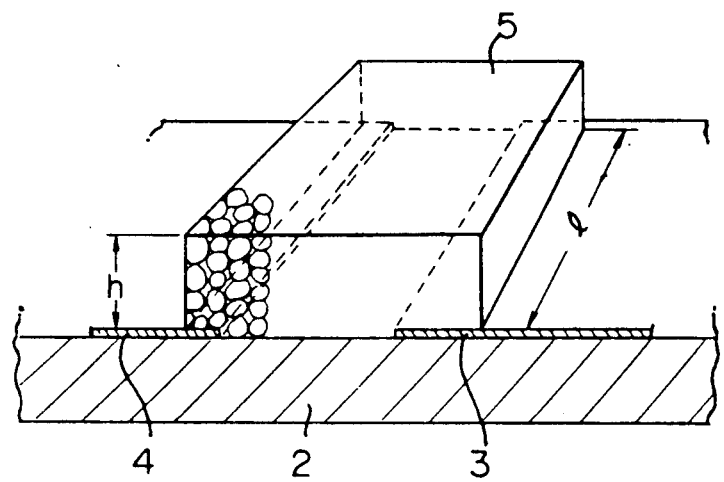
FIG. 3 is an explanatory prospective view of a varistor layer bridging a picture element electrode and a signal line in a conventional LCD device.

FIGS. 1A and 1B are a partial cross-sectional view and a plane view of an example of conventional liquid crystal display device having a polymer-dispersed liquid crystal material layer, respectively. In the conventional liquid crystal display device 1 of FIGS 1A and 1B, a plurality of picture element electrodes 3 are arranged in a predetermined pattern on an upper face of a first transparent base 2; a plurality of signal lines 4 for supplying electric signals to the picture element electrode 3 are arranged adjacent to the picture element electrodes 3 on the first base 2; a plurality of non-linear elements each consisting of a varistor layer 5 are arranged on the first base 2 so as to electrically connect the signal lines 4 with the adjacent picture element electrodes 3; a second transparent base 6 is arranged in parallel to and spaced from the first base 2; a plurality of transparent scanning electrodes 7 are fixed to the lower face of the second base 6; and the space between the first base 2 and the second base 6 is filled with a liquid crystal material 9.

In this conventional LCD device, the picture element electrodes 3 at least partially face the corresponding scanning electrodes 7 through the liquid crystal material layer 5, at a right angle from the first and second bases 2 and 6.

The varistor is usually used as a surge-absorbing element and satisfies a specific relationship between a voltage (V) and an electric current (I) as shown in FIG. 2.

Referring to FIG. 2, the varistor exhibits a high resistance under a voltage having a value less than a specific value Va, and substantially does not allow an electric current to flow therethrough. When the voltage reaches the value Va, however, the varistor exhibits a significantly reduced resistance and allows the electric current to flow therethrough, as shown in FIG. 2. The specific voltage value Va is referred to as a threshold value voltage $V_{th}$ or a varistor voltage. This varistor voltage and capacity can be easily controlled by controlling the distance between electrodes or the size of the varistor particles, and thus the varistor is usable in various fields, for example, as a protective material for electronic circuits and against lightening.

The conventional varistor in FIG. 1A is in the form of a layer or film consisting of fine varistor particles. The layer of the fine varistor particles can be formed between the signal lines and the adjacent picture element electrodes by printing a paste comprising the fine varistor particles.

Referring to FIG. 3 which shows an explanatory prospective view of a varistor layer in a conventional liquid crystal display device, wherein a picture element electrode 3 is connected to a signal line 4 through a varistor layer 5. When the varistor layer 5 is in form of a hexahedron, as shown in FIG. 3, the effective cross-sectional area of the varistor layer 5 is a product of a length l and an effective height h of the varistor layer 5.

When the size of the picture element electrode 3 is reduced, the length l is shortened, and thus the effective cross-sectional area of the varistor layer 5 becomes small.

The inventors of the present invention studied the relationship between the stability of the varistor voltage and the structure of the varistor layer, and found that the stability of the varistor voltage increases with an increase in the effective cross-sectional area of the varistor layer. Therefore, a reduction in the effective cross-sectional area of the varistor layer results in a lowering of the stability of the varistor voltage of the varistor layer.

If the length l is increased, the area of a portion of the picture element electrode covered by the varistor layer is increased, and thus the aperture ratio of the display is decreased and the brightness of the display surface is reduced.

Further, even if the height of the varistor layer is increased to more than the effective height h of the varistor layer, the stability of the varistor voltage is not improved.

The above-mentioned disadvantages of the conventional liquid crystal display device can be eliminated by the LCD device of the present invention.

Figure 4:
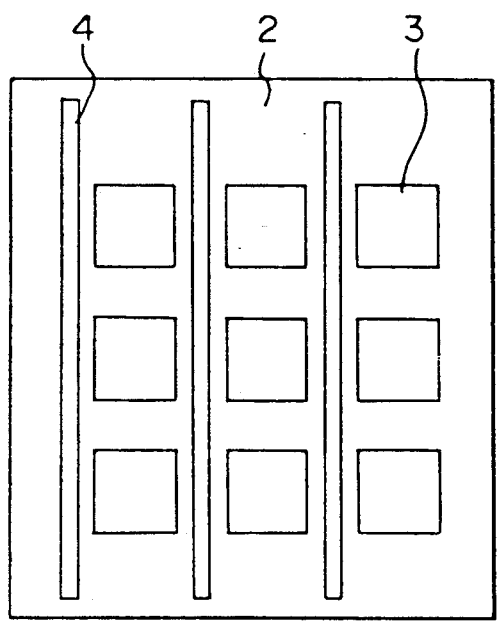
FIG. 4 shows an arrangement of picture element electrodes and signal lines on a first base in an embodiment of the LCD device of the present invention.

In a portion of the LCD device of the present invention as shown in FIG. 4, a plurality of picture element electrodes 3 are arranged in a predetermined pattern on a first transparent base 2, and a plurality of signal lines 4 for supplying electric signals to the picture element electrode 3 are arranged in a predetermined pattern on the first base 3. The signal lines 4 are located adjacent to and spaced from the picture element electrodes 3.

Figure 5:
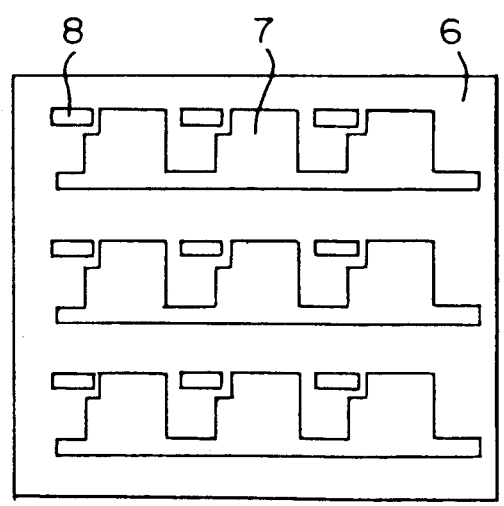
FIG. 5 shows an arrangement of scanning electrodes and transit electrodes on a second base in an embodiment of the LCD device of the present invention.

Referring to FIG. 5, a plurality of scanning electrodes 7 are arranged in a predetermined pattern on the second transparent base 6. Also, a plurality of transit electrodes 8 are arranged in a predetermined pattern on the second base 6.

Figure 6:
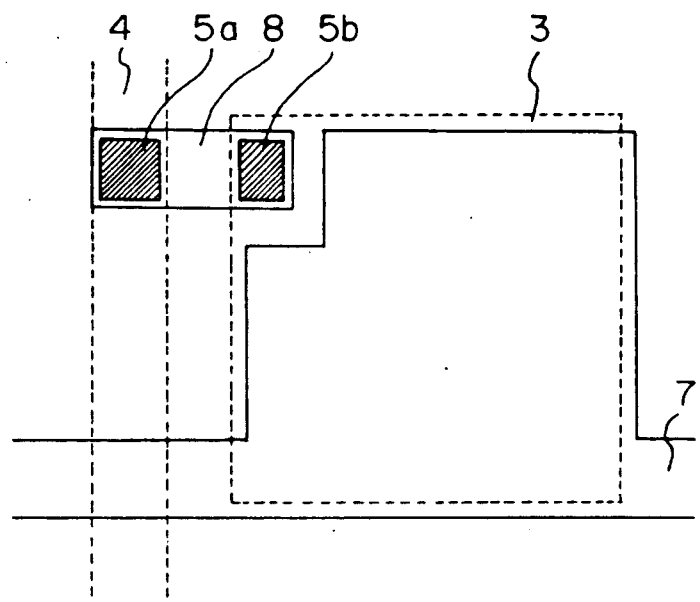
FIG. 6 is an explanatory view of a positional relationship among a scanning electrodes, a transit electrodes, a picture element electrode, a signal line and varistor layers in an embodiment of the LCD device of the present invention.
Figure 7:
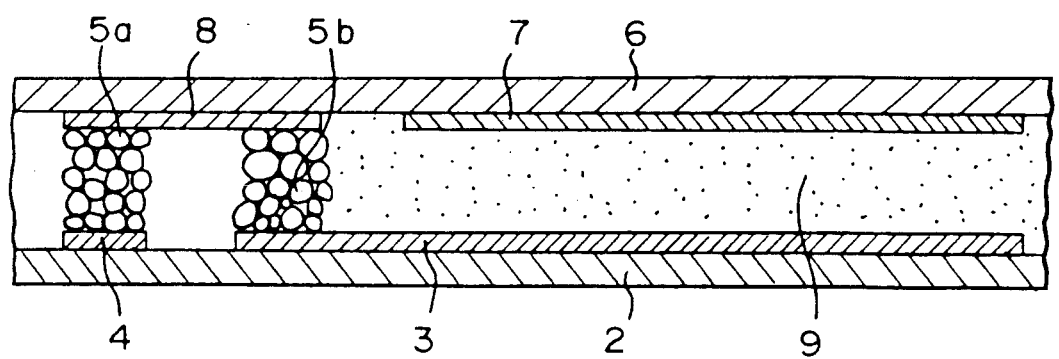
FIG. 7 is an explanatory cross-sectional view of an embodiment of the LCD device of the present invention.

As shown in FIGS. 6 and 7, the picture element electrode 3 on the first base 2 faces the scanning electrode 7 on the second base 6, and the transit electrode 8 on the second base 6 faces the signal lines 4 and the picture element electrodes 3.

Referring to FIGS. 6 and 7, a portion of the transit electrode 8 is connected to the signal line 4 through a first varistor layer 5a, and another portion of the transit electrode 8 is connected to the picture element electrode 3 through a second varistor layer 5b separate from the first varistor layer 5a.

Figure 8:
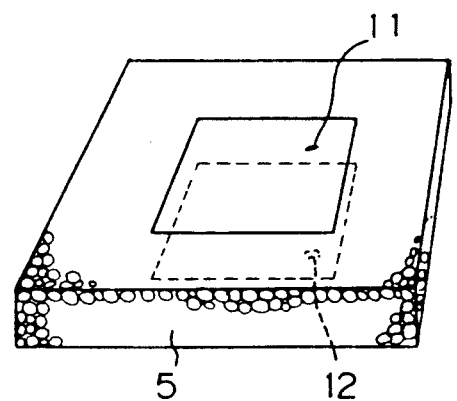
FIG. 8 is an explanatory view of a positional relationship among two electrodes spaced from and facing each other and a varistor layer usable for the present invention.

Generally, as shown in FIG. 8, when an electrode 11 is connected to another electrode 12 located in parallel to and spaced from the electrode 11 through a varistor layer 5, which extends from the electrode 11 to another electrode 12 at a right angle to the connecting faces of the electrodes 11 and 12, the effective cross-sectional area of the varistor layer 5 is equal to the area of either one of the electrodes 11 and 12 which is smaller than the other.

That is, in the varistor layer as shown in FIG. 8, the effective cross-sectional area depends on the area of one of the electrodes facing each other, and thus the varistor voltage is constant and stable, and the current-voltage property of the LCD becomes constant.

The transit electrode may be made from any of electroconductive materials. Also, semiconductive material is usable for the transit electrode. Preferable electroconductive materials are ITO, Si, Cr, Ta, Al, Ni, etc.

The varistor layer comprises a number of fine varistor particles.

When the fine varistor particles have a substantially uniform size and a substantially spherical shape, the resultant varistor layers connecting the signal lines and the adjacent picture elements electrodes exhibit a substantially uniform varistor voltage ($V_{th}$), and thus the resultant display device can produce a satisfactorily uniform display.

The varistor particles preferably have a size of 1 to 30 $\mu$m, more preferably 2 to 20 $\mu$m. When the varistor particles are too large, the resultant varistor non-linear element has an excessively large thickness, and such a thick element requires a thick liquid crystal material layer, and thus an excessively high drive voltage. When the size of the varistor particles is too small, the distances between the transit- electrode and signal lines or the adjacent picture element electrode must be shortened and this short distance makes it difficult to form precise gaps between the transit electrode and the signal lines or the picture element electrodes.

The varistor voltage between two electrodes can be controlled by controlling the distance between the electrodes, or the size of the varistor particles. Usually, the varistor voltage is controlled by controlling the size of the varistor particles.

The varistor layer or film can be produced by the following procedures.

Zinc oxide powder is molded into pellets under a pressure of 50 to 500 kg/cm$^2$ and sintered at a temperature of 700° C. to 1300° C., the sintered pellets are pulverized to provide zinc oxide fine particles having a size of 1 to 30 $\mu$m, preferably 2 to 20 $\mu$m, and the fine particles are further sintered at a temperature of 800° C. to 1300° C. to produce spherical particles.

The sintered spherical zinc oxide particles are doped with at least one member selected from $Bi_2O_3$, $Co_2O_3$, $MnO_2$, and $Sb_2O_3$, preferably in an amount of 0.1% to 10% based on the weight of the ZnO particles, at a temperature of 700° C. to 1300° C.

Preferably, the varistor particles are spherical and have an even size, as such varistor particles will form a non-linear element having a uniform threshold value voltage, and thus the resultant LCD device will display a clear picture.

The varistor layer does not completely cover the picture element electrode, and therefore, the LCD device of the present invention having the varistor layer can be used as a light transmission type device.

The resultant varistor particles are mixed with a binding material consisting of, for example, glass particles and/or an organic binder in an amount of 2% to 200% based on the weight of the varistor, to provide a printable varistor paste.

The organic binder is selected from evaporation-drying type binders which can be solidified by drying, and hardening type binders which can be solidified by curing.

The evaporation-drying type binders include cellulosic materials such as methyl cellulose, ethyl cellulose, cellulose triacetate, polyacrylic resins, for example, polymethyl methacrylate, vinyl acetate polymer and copolymer, and polyvinyl alcohol. The binder may contain a small amount of a solvent or plasticizer.

The hardening binder may be selected from room temperature-hardening binders, for example, epoxy binders (for example, DP-pure 60, made by 3M) and silicone binders (for example, TSE 352, made by Toshiba Silicone); thermal-hardening binders for example, epoxy binders (for example, JA-7434, made by 3M), a silicone binders (for example, Epoxy TSJ, 3155), which are heat-hardening type binders; photohardening monomers, for example, 2-ethylhexyl acrylate and dicyclopentenyl acrylate; photohardening prepolymers, for example, polyesteracrylate, epoxyacrylate, and mixtures of the above-mentioned substances. Preferably, the photohardening type binders containing a monomer and/or a prepolymer are used for the present invention, and further, radiation-hardening or electronic ray hardening binders are used for the present invention.

The varistor paste is applied, by a screen printing method, to predetermined portions of the picture element electrodes and signal lines on the first base or of the transit electrodes on the second base, and the paste layer is solidified and heat treated at a temperature of 300° C. to 500° C. when the glass particles are used as a binder, to form a varistor layer.

Before or after the solidification, the first base and the second base are superimposed through spacers having a predetermined thickness and a varistor layer is fixed between the transit electrode and the picture element electrode and/or the signal line.

The distance between the first base and the second base is variable, depending on the thickness of the spacers.

Since the resultant non-linear element consisting of varistor layer covers a part of the area of each picture element electrode, and the residual area of each picture element electrode is transparent, the light transmission type LCD device can be realized.

In the LCD device of the present invention, each varistor layer is preferably in the form, for example, as shown in FIG. 7.

Figure 9:
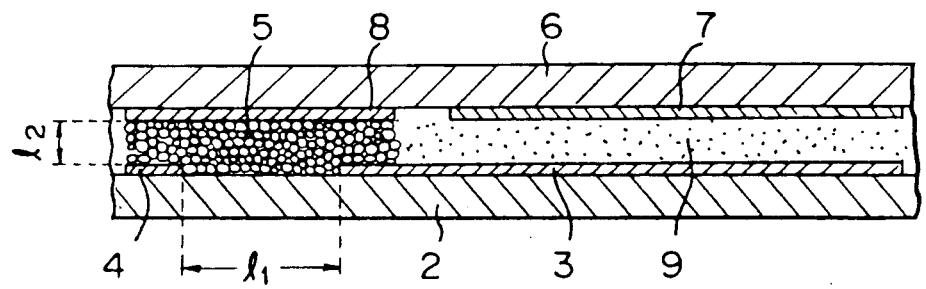
FIG. 9 is an explanatory cross-sectional view of another embodiment of the LCD device of the present invention.

In an embodiment of the LCD device of the present invention as shown in FIG. 9, each transit electrode 8 is connected to the corresponding picture element electrode 3, and to the signal line 4, through a common single varistor layer 4 satisfying the relationship $l_1 > 2l_2$.

Figure 10:
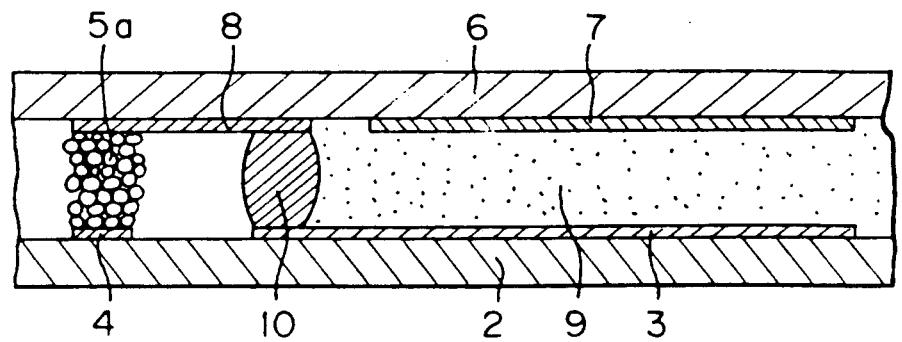
FIG. 10 is an explanatory cross-sectional view of still another embodiment of the LCD device of the present invention.

In another embodiment of the LCD device of the present invention as shown in FIG. 10, a signal line 4 is connected to a portion of a transit electrode 8 through a varistor layer 5a, and the picture element electrode 3 is connected to another portion of the transit electrode 8 through a connecting layer 10 consisting of an electroconductive material.

Alternatively, the connection between the signal line and the transit electrode is made by a connecting layer consisting of the electroconductive material, and the connection between the picture element electrode and the transit electrode is made by a varistor layer.

There is no restriction for the electroconductive material for the connecting layer. The connecting layer may comprise a semiconductor material and preferably made from a paste containing metal particles or carbon particles.

The LCD device of the present invention has a liquid crystal material layer arranged between the picture element electrodes fixed on the first base and the scanning electrodes fixed on the second base.

The liquid crystal material can be selected from dynamic scattering (DS) liquid crystals, twisted nematic (TN) liquid crystals, electrically controlled birefringence (ECB) liquid crystals, phase change (PC) liquid crystals, guest-host liquid crystals, and liquid crystals contained in a polymer, for example, polymer-dispersed liquid crystals and polymer network type liquid crystals.

The liquid crystal material comprises liquid crystals responsive to the presence of an electric field, to increase an optical transmission, and surface means for affecting the natural structure of the liquid crystals to induce a distorted alignment thereof in the absence of the electric field to reduce an optical transmission.

The polymer-dispersed liquid crystal material includes discrete amounts of liquid crystal materials dispersed in a matrix consisting essentially of a polymeric material, and a continuous liquid crystal phase filled in network-shaped continuous pores formed in a matrix consisting essentially of a polymeric material as disclosed in T. Kajiyama et al., Chemistry Letter, 679 (1979).

The liquid crystals dispersed in the polymeric matrix include Nematic Curvilinear Aligned Phase (NCAP) type liquid crystal materials in which liquid crystals are dispersed in the form of fine spheres independently from each other in a polymeric matrix; liquid crystals dispersed and contained in a thermoplastic resin; and liquid crystals dispersed in an epoxy resin. The liquid crystals usable for the present invention may be nematic liquid crystals or smectic liquid crystals.

The polymeric material usable as a matrix of the liquid crystal material is preferably selected from polystyrene, polyvinyl chloride, polyvinyl alcohol, polycarbonate, polybutadiene rubber, polymethylmethacrylate, polybutylmethacrylate, polyvinylpyrrolidone, ethyl cellulose, cyanoethyl cellulose, polyvinylidene fluoride, nitrile rubber (NBR) and polyethylene.

In the LCD device of the present invention, the liquid crystal material is preferably the polymer dispersed type liquid crystal material used in combination with the varistor layer.

The polymer dispersed liquid crystal material is disclosed in PCT International Publication No. 83/01016, U.S. Pat. No. 4,435,047 and "Electronic Parts and Materials" No. 12, 1987, pages 67 to 70. In the polymer dispersed type liquid crystal material, a liquid crystal material having a positive dielectric anisotropy is surrounded by a transparent surface means or matrix for affecting the natural structure of the liquid crystal material, to induce a distorted alignment thereof in the absence of an electric field and thus reduce the optical transmission. The liquid crystal material is responsive to the presence of an electric field, to increase the amount of optical transmission.

In the polymer dispersed liquid crystal material, the above-mentioned surface means or matrix usually contains discrete amounts of the liquid crystal material dispersed therein, for example, in the form of capsules. Usually, the surface means comprises a transparent organic polymeric material having a refractive index that is nearly equal to the ordinary refractive index of the liquid crystal material.

The transparent organic polymeric material may comprise a thermoplastic polymer material, for example, a polyester resin, or a thermosetting polymeric material, for example, an epoxy resin.

The liquid crystal material layer usually has a thickness of 5 to 30 μm.

In a process for producing the LCD device of the present invention, a predetermined amount of a liquid crystal material, for example, a nematic liquid crystal material emulsion which usually has a high viscosity, is applied to a surface of either one of a first base on which a plurality of picture element electrodes and a plurality of signal lines are arranged and fixed in a predetermined pattern, or a second base on which a plurality of scanning electrodes and a plurality of transit electrodes are arranged and fixed in a predetermined pattern, and then the liquid crystal material emulsion-applied base is laminated on and fixed to the other base under a pressure. A plurality of varistor layers are formed on the picture element electrodes, the signal lines or the transit electrodes before the laminating step.

In the application of the liquid crystal material emulsion, an emulsion comprising, for example, liquid crystals, an aqueous solution of polyvinyl alcohol, and pleochroic black dye is coated on the surface of the base by using a doctor blade, and then the resultant emulsion layer is dried.

Preferably, the liquid crystal material emulsion is applied to the second base and then a first base is laminated on and fixed to the second base through the liquid crystal material layer.

In the lamination and fixing, the first and second bases are superimposed on each other and pressed together under a pressure of about 0.02 to 30 kg/cm$^2$, more preferably about 1 to 30 kg/cm$^2$ by using, for example, a pressing roller. Alternatively, the laminated first and second bases are pressed under a reduced pressure, to remove air bubbles formed between the two bases.

In another process for producing the LCD device of the present invention, a first base on which a plurality of picture element electrodes, a plurality of signal lines, and a plurality of varistor paste layers are arranged and fixed in a predetermined pattern, and a second base on which a plurality of scanning electrodes and a plurality of transit electrodes are arranged and fixed in a predetermined pattern, are superposed on each other with a gap having a predetermined thickness therebetween. The varistor paste layers are solidified before or after the superposition of the two bases; the side edges of the laminate are sealed by an adhesive agent, while forming a small opening between the superimposed two bases and connected to the space formed between the first and second bases; a mixture containing liquid crystals and a polymer precursor is injected into the space between the two bases; and then the polymer precursor in the injected mixture is cured to convert it to a solid polymer and to provide a polymer dispersed liquid crystal material layer.

In the superposing step, the distance between the first and second base is adjusted by using spacers having a predetermined thickness. The varistor layers formed on the first or second base can be utilized as spacers.

The polymer precursor usable for the above-mentioned process can be selected from photo- or heat-setting polymeric materials, for example, epoxy resin varnishes; photo-setting monomeric materials, for example, 2-ethylhexyl acrylate and dicyclopentenyl acrylate; photo- or heat-setting prepolymers, for example, epoxyacrylate compounds, and mixtures of two or more of the above-mentioned substances. Other polymer precursors which are capable of being cured by a radiation or electron beams can be utilized for the present invention.

In still another process for producing the LCD device of the present invention, a polymer dispersed liquid crystal material layer is formed on the surface portions of either one of a first base on which a plurality of picture element electrodes, and a plurality of signal lines are arranged and fixed in a predetermined pattern, or a second base on which a plurality of scanning electrodes are arranged and fixed in a predetermined pattern, except for surface portions on which a plurality of varistor layers are to be formed; a varistor paste is applied to the portions of the other one of the first and second base; the emulsion-applied base is closely adhered to the other base; and the varistor paste layer is solidified while utilizing the liquid crystal material layer as a spacer, and the varistor paste layer is heat treated.

The polymer precursor can be selected from the same substances as mentioned above.

EXAMPLES

The present invention will be further explained by way of specific examples, which in no way limit the scope of the present invention.

Example 1

A varistor paste was prepared by mixing varistor particles, comprising, as a principal component, ZnO and having a size of from 1 to 5 μm, with an epoxy resin in an amount of 1/50 to 5 times the weight of ZnO.

A plurality of picture element electrodes and a plurality of signal lines were fixed in the pattern shown in FIG. 4 on a first base and the varistor paste was applied, by a printing method, to the signal lines and the picture element electrodes as shown in FIG. 6. The printed varistor layers had a height of 16 μm.

Separately, a plurality of scanning electrodes and a plurality of transit electrodes were fixed, in the pattern as indicated in FIG. 5, on a second base.

Figure 11:
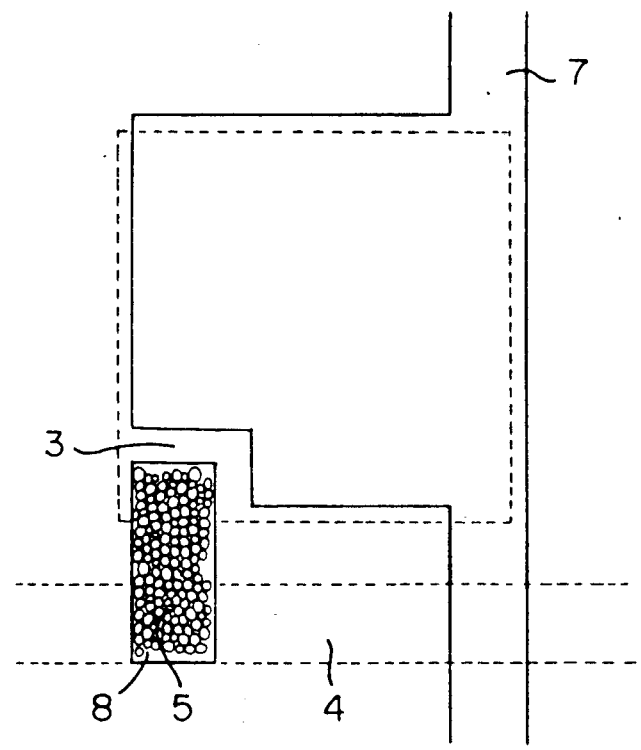
FIG. 11 shows an arrangement of a scanning electrode, a transit electrode, a picture element electrode, a signal line, and a varistor layer in an embodiment of the LCD device of the present invention.

The first base was superimposed on the second base through spacers having a thickness of 15 μm, in such a manner that, as indicated in FIG. 11, a scanning electrode 7 and a transit electrode 8 on a second base (not shown) were facing a picture element electrode 3 and a signal line 4 on a first base (not shown) in the positional relationship as shown in the drawing.

Then the varistor paste layer was hardened, and the side edges of the superimposed first and second base assembly were sealed while forming a small opening for introducing a liquid crystal material.

The effective cross-sectional area of the varistor layer was 0.01 mm$^2$ on the signal line 4 and on the picture element electrode.

The distance between the signal line 4 and the adjacent picture element electrode was 30 μm.

A mixture of 60 g of a liquid crystal material, with 40 g a polymeric precursor comprising an epoxy monomer and a curing agent, and 1.8 g of a pleochroic dye, was prepared by stirring and was injected into the space between the first and second bases, through the opening, under a reduced pressure. The injected mixture was left to stand at room temperature for 24 hours to form a black, opaque polymer-dispersed liquid crystal material layer.

The resultant LCD device was operated by an active matrix drive at a duty ratio of 1/128 under an alternating voltage of ±180 V between the signal lines and the scanning electrodes. The resultant display images derived from the predetermined picture elements had a contrast of 12:1, and substantially no deviation in the brightness of the images was found.

Figure 12:
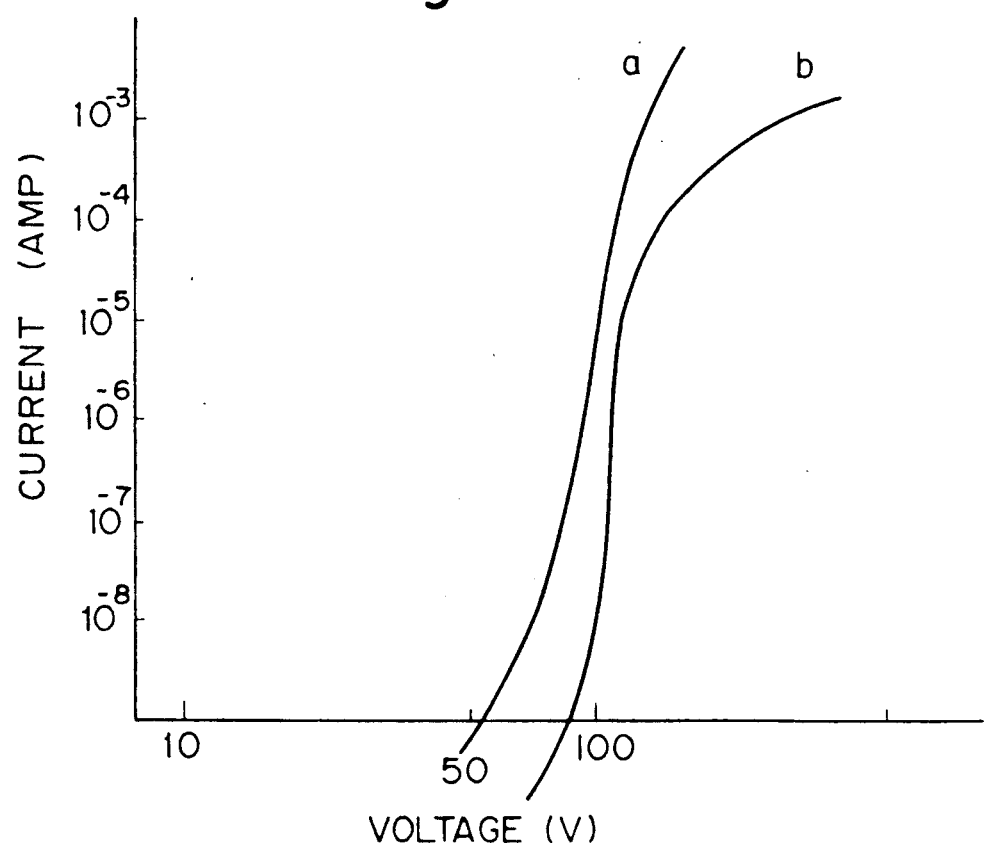
FIG. 12 is a graph showing current-voltage curves of the LCD device of the present invention and of a conventional LCD device.

The varistor element having the above-mentioned constitution exhibited a current-voltage curve a in FIG. 12, and in view of curve a, the current-voltage performance of the varistor element in the high current region was good.

The fluctuations in the varistor voltage were small and the standard deviation in the varistor voltage was 1.8 V.

Comparative Example 1

The same procedures as in Example 1 were carried out, except that the transit electrodes were not arranged on the second base.

When the resultant LCD device was operated, the resultant display images exhibited a contrast of 10:1 and the brightness of the images was fluctuated.

The varistor element having the same constitution as mentioned above exhibited a current-voltage curve b in FIG. 12. In view of curve b, the current-voltage performance of the varistor element in the high current region was poor. The fluctuations in the varistor voltage were large, and the standard deviation in the varistor voltage was 4.2 V.

We claim:

1. A liquid crystal display device comprising:
   a first transparent base;
   a plurality of picture element electrodes arranged on the first base;
   a plurality of signal lines for supplying electric signals to the picture element electrodes and arranged adjacent to and spaced from the picture element electrodes on the first base;
   a second transparent base arranged in parallel to and spaced from the first base;
   a plurality of scanning electrodes arranged on the second base and facing and spaced from the picture element electrodes;
   a plurality of transit electrodes arranged on the second base, facing and spaced from the corresponding signal lines and the picture element electrodes on the first base and spaced from the scanning electrodes on the second base;
   a liquid crystal material layer arranged between the picture element electrodes and the scanning electrodes; and
   a plurality of varistor layers comprising fine varistor particles and each extending from at least one of the corresponding picture element electrode and signal line to the corresponding transit electrode to electrically connect the picture element electrodes to the signal lines through the varistor layers and the transit electrodes.

2. The device as claimed in claim 1, wherein the varistor layer is in the form of a pillar.

3. The device as claimed in claim 1, wherein each picture element electrode is connected to a portion of the corresponding transit electrode through a first varistor layer and another portion of the transit electrode is connected to the corresponding signal line through a second varistor layer separate from the first varistor layer.

4. The device as claimed in claim 1, wherein each transit electrode is connected to the corresponding picture element electrode and signal line through a single varistor layer.

5. The device as claimed in claim 1, wherein a portion of each transit electrode is connected to one of the corresponding picture element electrode and signal line through a varistor layer and another portion of the transit electrode is connected to the other one of the corresponding picture element electrode and signal line through a connecting layer consisting of an electro-conductive material.

6. The device as claimed in claim 1, wherein the varistor layers are formed by a printing operation from a paste comprising the fine varistor particles.

7. The device as claimed in claim 1, wherein the fine varistor particles have a size of from 1 to 30 μm.

8. The device as claimed in claim 1, wherein the varistor particles consist of ZnO particles doped with at least one member selected from $Bi_2O_3$, $Co_2O_3$, $MnO_2$ and $Sb_2O_3$.

* * * * *